(12) United States Patent
Lee et al.

(10) Patent No.: US 10,553,844 B2
(45) Date of Patent: Feb. 4, 2020

(54) BATTERY PACK HAVING HOLD DOWN BRACKET

(71) Applicant: LG CHEM, LTD., Seoul (KR)

(72) Inventors: Yoonhee Lee, Daejeon (KR); Tae Hyuck Kim, Daejeon (KR); Tae Hwan Roh, Daejeon (KR); Jin Kyu Lee, Daejeon (KR); Junhee Jung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 188 days.

(21) Appl. No.: 15/302,909

(22) PCT Filed: Apr. 30, 2015

(86) PCT No.: PCT/KR2015/004380
§ 371 (c)(1),
(2) Date: Oct. 7, 2016

(87) PCT Pub. No.: WO2015/170852
PCT Pub. Date: Nov. 12, 2015

(65) Prior Publication Data
US 2017/0047563 A1    Feb. 16, 2017

(30) Foreign Application Priority Data

May 7, 2014    (KR) .................. 10-2014-0054012

(51) Int. Cl.
*H01M 2/10* (2006.01)
*B60L 50/64* (2019.01)
(Continued)

(52) U.S. Cl.
CPC ........... *H01M 2/1077* (2013.01); *B60L 50/64* (2019.02); *H01M 2/206* (2013.01); *B60L 50/66* (2019.02);
(Continued)

(58) Field of Classification Search
CPC ............. H01M 2220/20; H01M 2/206; H01M 2/1077; H01M 2/1083; B60L 11/1822;
(Continued)

(56) References Cited

U.S. PATENT DOCUMENTS 3,420,489 A * 1/1969 Doggett .................. B60R 16/04
180/68.5
6,230,834 B1   5/2001 Van Hout et al.
(Continued)

FOREIGN PATENT DOCUMENTS

CN    102576835 A    7/2012
CN    102593388 A    7/2012
(Continued)

OTHER PUBLICATIONS

International Search Report for PCT/KR2015/004380 (PCT/ISA/210) dated Aug. 13, 2015 is attached herewith.
(Continued)

*Primary Examiner* — Jonathan G Jelsma
*Assistant Examiner* — Omar M Kekia
(74) *Attorney, Agent, or Firm* — Birch, Stewart, Kolasch & Birch, LLP

(57) ABSTRACT

Disclosed herein is a battery pack including a battery module assembly configured to have a structure in which two or more battery modules, each of which includes battery cells arranged in an upright state such that electrode terminals of the battery cells are directed upward, are arranged such that the battery modules are adjacent to each other, and outward protrusions are formed at a lower end of one side or lower ends of opposite sides of each of the battery modules, a base plate, on a top of which the battery module assembly is loaded, and a hold down bracket having one side region covering the outward protrusions of the battery modules and the other side region coupled to the base plate so as to
(Continued)

correctly fix the respective battery modules of the battery module assembly to the base plate.

22 Claims, 4 Drawing Sheets

(51) Int. Cl.
*H01M 2/20* (2006.01)
*B60L 53/80* (2019.01)
*B60L 50/60* (2019.01)

(52) U.S. Cl.
CPC ......... *B60L 53/80* (2019.02); *B60L 2270/142* (2013.01); *H01M 2/1083* (2013.01); *H01M 2220/20* (2013.01)

(58) Field of Classification Search
CPC ............................ B60L 11/1877; B60L 50/64; B60L 2270/142; B60L 53/80; B60L 50/66
USPC ............................................................ 429/99
See application file for complete search history.

(56) References Cited

U.S. PATENT DOCUMENTS

| | | | |
|---|---|---|---|
| 2007/0170323 A1 | 7/2007 | Boville | |
| 2008/0292913 A1* | 11/2008 | Hong | H01M 2/0207 429/7 |
| 2008/0318119 A1 | 12/2008 | Watanabe et al. | |
| 2009/0325053 A1 | 12/2009 | Koetting et al. | |
| 2012/0115004 A1 | 5/2012 | Park et al. | |
| 2013/0224541 A1* | 8/2013 | Nam | H01M 2/1016 429/90 |
| 2013/0309560 A1 | 11/2013 | Lent et al. | |

FOREIGN PATENT DOCUMENTS

| | | |
|---|---|---|
| CN | 102623739 A | 8/2012 |
| CN | 203491319 U | 3/2014 |
| CN | 204792962 U | 11/2015 |
| DE | 10 2011 077 330 A1 | 12/2012 |
| EP | 0 429 746 A1 | 6/1991 |
| EP | 2 293 362 A2 | 3/2011 |
| GB | 2 120 004 A | 11/1983 |
| JP | 11-297290 A | 10/1999 |
| JP | 2001-313018 A | 11/2001 |
| JP | 2002-225570 A | 8/2002 |
| JP | 2003-237381 A | 8/2003 |
| JP | 2007-203912 A | 8/2007 |
| JP | 2012-84239 A | 4/2012 |
| JP | 2013-175425 A | 9/2013 |
| JP | 2014-35970 A | 2/2014 |
| JP | 2014-67719 A | 4/2014 |
| KR | 10-2005-0119660 A | 12/2005 |
| KR | 10-2010-0003137 A | 1/2010 |
| KR | 10-1191662 B1 | 10/2012 |
| KR | 10-2013-0076506 A | 7/2013 |
| KR | 10-2013-0129833 A | 11/2013 |
| KR | 10-1326182 B1 | 11/2013 |
| WO | WO 2006/090904 A1 | 8/2006 |

OTHER PUBLICATIONS

European Search Report for Appl. No. 15789469.2 dated Feb. 17, 2017.

European Search Report for Appl. No. 15789469.2 dated Jun. 21, 2017.

* cited by examiner

【FIG. 1】
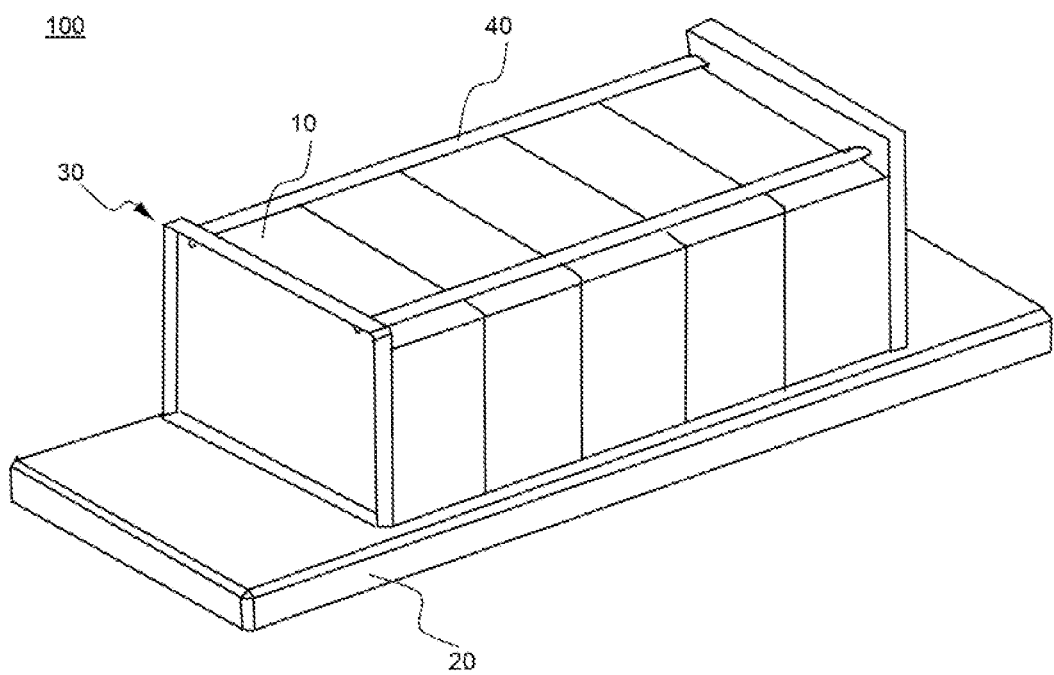

[FIG. 2]
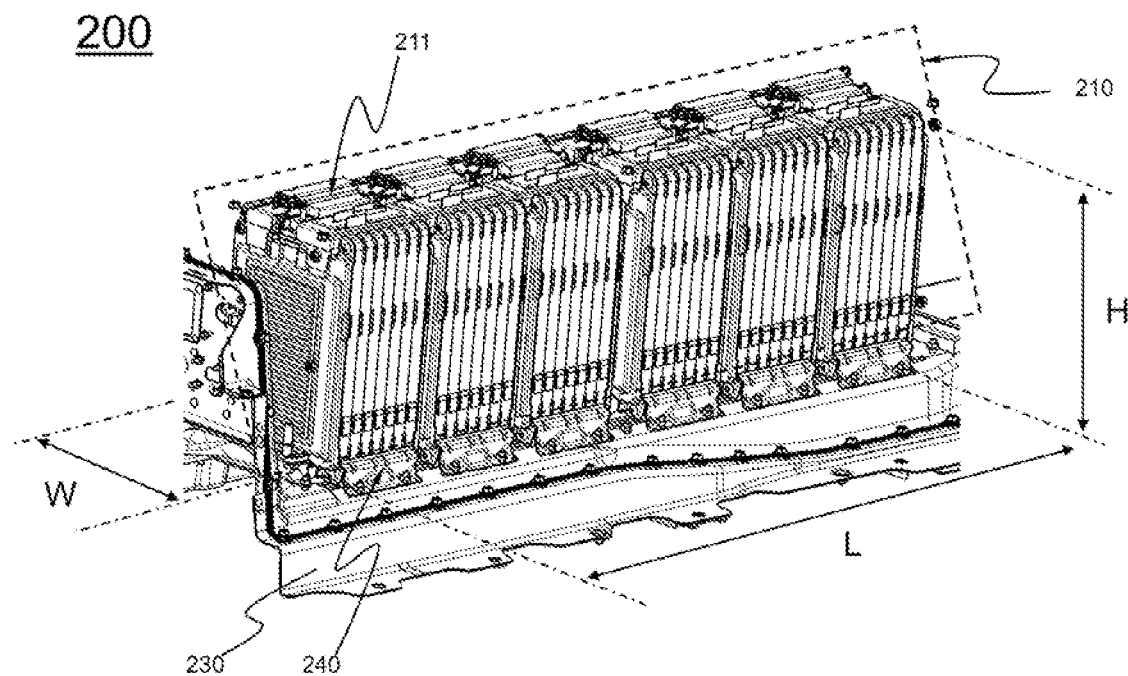
[FIG. 3]
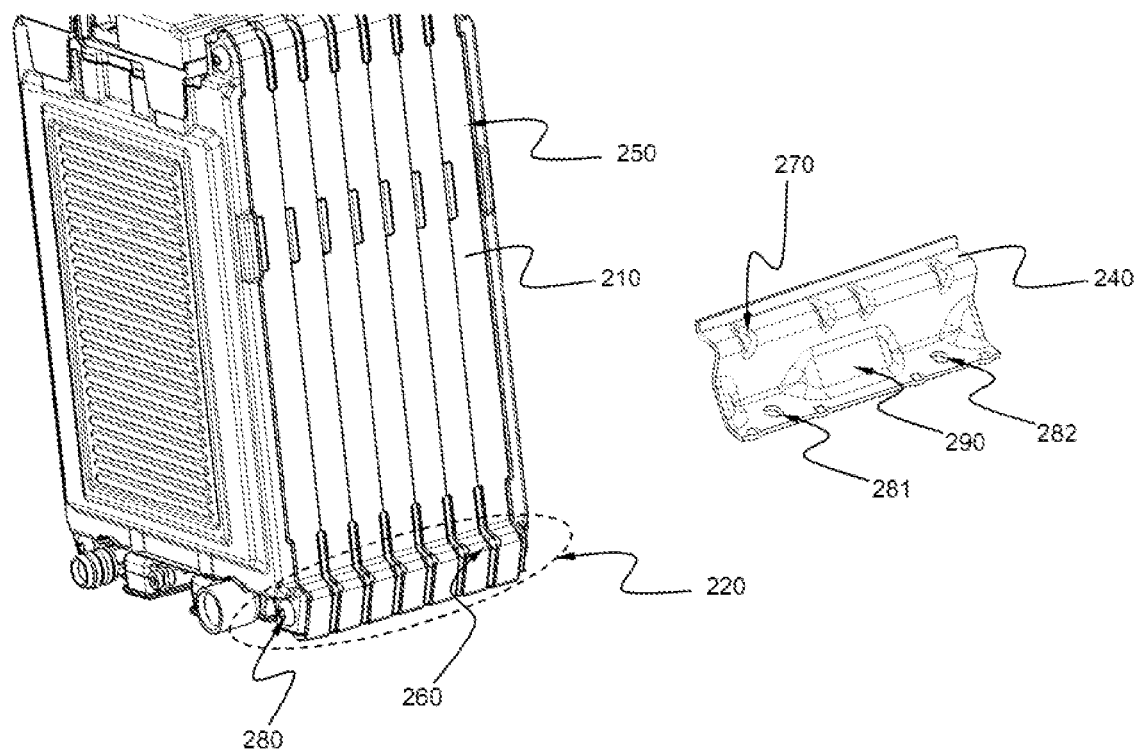

【FIG. 4】
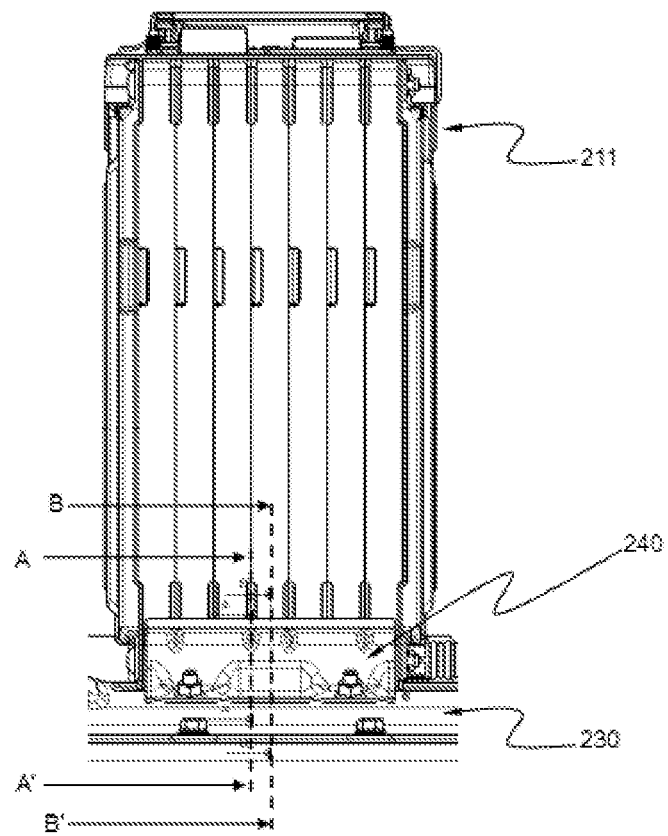
【FIG. 5】
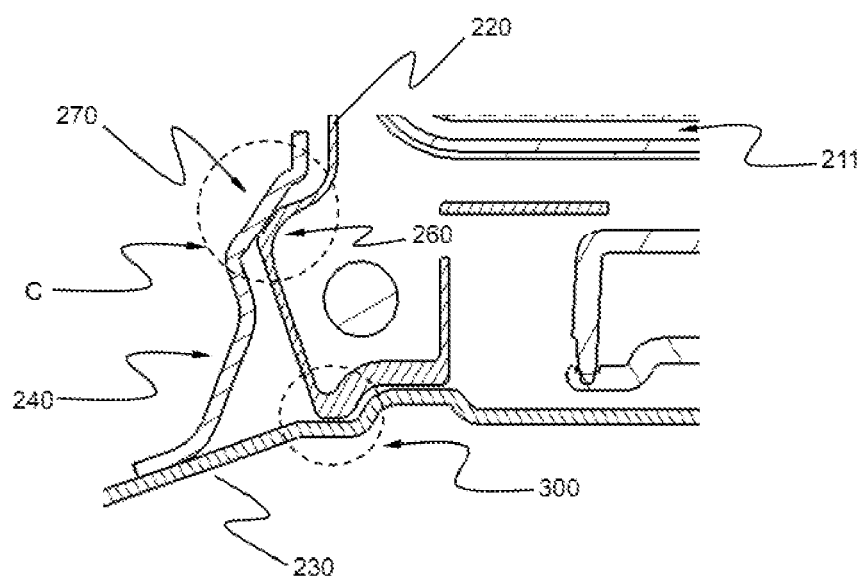

[FIG. 6]
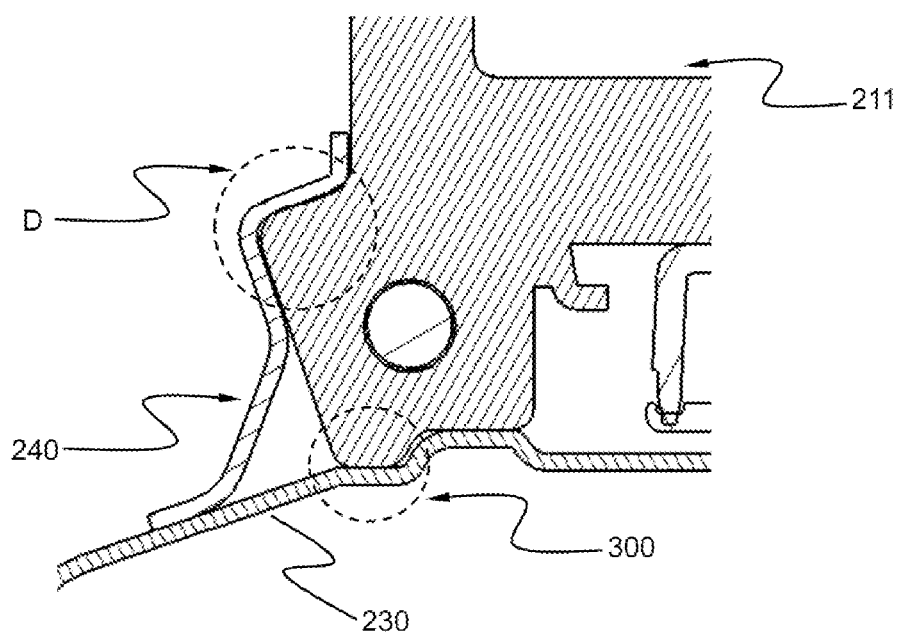

BATTERY PACK HAVING HOLD DOWN BRACKET

TECHNICAL FIELD

The present invention relates to a battery pack including a hold down bracket.

BACKGROUND ART

One of the biggest problems caused by vehicles using fossil fuel, such as gasoline and diesel oil, is the creation of air pollution. A technology of using a secondary battery, which can be charged and discharged, as a power source for vehicles has attracted considerable attention as one method of solving the above-mentioned problem. As a result, electric vehicles (EV), which are operated using only a battery, and hybrid electric vehicles (HEV), which jointly use a battery and a conventional engine, have been developed. Some electric vehicles and hybrid electric vehicles are now being commercially used. A nickel-metal hydride (Ni-MH) secondary battery has been mainly used as the power source for electric vehicles (EV) and hybrid electric vehicles (HEV). In recent years, however, a lithium ion battery has also been used.

High output and large capacity are needed for such a secondary battery to be used as the power source for the electric vehicles (EV) and the hybrid electric vehicles (HEV). To this end, a plurality of small-sized secondary batteries (unit cells) is connected in series to each other so as to form a battery module and a battery pack. According to circumstances, a plurality of small-sized secondary batteries (unit cells) is connected in series and in parallel to each other so as to form a battery module and a battery pack.

In general, such a battery pack has a structure to protect battery modules, each of which has secondary batteries mounted therein. The structure of the battery pack may be varied based on the kind of vehicles or installation position of the battery pack in the vehicles. One of the structures to effectively fix large-capacity battery modules is based on supporting bars and end plates. This structure is advantageous in that movement of the battery modules is minimized even when load is applied toward the supporting bars. To this end, however, it is necessary to sufficiently secure rigidity of the supporting bars and end plates.

In connection with this case, a conventional battery pack including a single battery module is exemplarily shown in a perspective view of FIG. 1.

Referring to FIG. 1, a battery pack 100 includes unit modules 10, each of which has battery cells mounted therein, a base plate 20, a pair of end plates 30, and supporting bars 40.

The unit modules 10 are stacked at the top of the base plate 20 in a state in which the unit modules 10 are vertically erected. The end plates 30 are disposed in tight contact with the outsides of the outermost unit modules 10 in a state in which the lower end of each of the end plates 30 is fixed to the base plate 20.

The supporting bars 40 are connected between the upper parts of the end plates 30 so as to interconnect and support the end plates 30.

However, the battery pack with the above-stated construction does not include a structure to support the battery pack in the forward and backward direction when external force is applied to the battery pack in the forward and backward direction. Furthermore, the battery pack does not include a structure to stably fix the battery cells constituting each unit module. As a result, it is not possible to prevent deformation of the internal structure of the battery pack.

Therefore, there is a high necessity for a battery pack having a specific structure that is capable of minimizing deformation of the battery pack when external force is applied to the battery pack in the forward and backward direction.

DISCLOSURE

Technical Problem

Therefore, the present invention has been made to solve the above problems, and other technical problems that have yet to be resolved.

It is an object of the present invention to provide a battery pack including a hold down bracket to correctly fix battery modules constituting a battery module assembly to a base plate, whereby it is possible to stably fix the battery modules and, in particular, to minimize internal deformation of the battery pack due to vibration of the battery pack in a forward and backward direction caused when external force is applied to the battery pack.

Technical Solution

In accordance with one aspect of the present invention, the above and other objects can be accomplished by the provision of a battery pack including a battery module assembly configured to have a structure in which two or more battery modules, each of which includes battery cells arranged in an upright state such that electrode terminals of the battery cells are directed upward, are arranged such that the battery modules are adjacent to each other, and outward protrusions are formed at a lower end of one side or lower ends of opposite sides of each of the battery modules, a base plate, on a top of which the battery module assembly is loaded, and a hold down bracket having one side region covering the outward protrusions of the battery modules and the other side region coupled to the base plate so as to correctly fix the respective battery modules of the battery module assembly to the base plate.

In the battery pack according to the present invention, the outward protrusions are formed at the lower end of one side or the lower ends of opposite sides of each of the battery modules, and the hold down bracket has one side region covering the outward protrusions of the battery modules and the other side region coupled to the base plate. Consequently, it is possible to stably fix the battery modules and to minimize internal deformation of the battery pack due to vibration of the battery pack in a forward and backward direction caused when external force is applied to the battery pack.

In the present invention, each of the battery modules may be a battery cell itself or a small-sized module having two or more battery cells mounted therein. Each of the battery cells may be a plate-shaped battery cell, which provides a high stacking rate in a limited space. For example, each of the battery cells may be configured to have a structure in which an electrode assembly is mounted in a battery case made of a laminate sheet.

An example of a battery module having two or more battery cells mounted therein is disclosed in Korean Patent Application No. 2006-12303, which has been filed in the name of the applicant of the present application. In the disclosure of this patent application, the battery module is configured to have a structure in which two battery cells are mounted to a frame member having input and output terminals in a state in which the battery cells are disposed in tight contact with each other such that the battery cells face each other.

Another example of the battery module is disclosed in Korean Patent Application No. 2006-20772 and No. 2006-45444, which have also been filed in the name of the applicant of the present application. In the disclosure of each of these patent applications, the battery module is configured to have a structure in which outsides of two secondary batteries are covered with a pair of high-strength cell covers in a state in which the secondary batteries are disposed in tight contact with each other such that the secondary batteries face each other.

The disclosures of the above patent applications are incorporated herein by reference. Of course, however, the structure of each of the battery cells constituting each battery module according to the present invention is not limited to the above examples of the battery modules disclosed in the above patent applications.

In a concrete example, each of the battery modules may be configured to have a structure in which two or more unit modules, each of which includes one or more battery cells mounted in a cartridge, are arranged such that the unit modules are adjacent to each other, and the battery cells of each of the battery modules are connected in series to each other.

More specifically, the cartridge may be configured to have a frame structure to fix outer edge sealed portions of the battery cells located at opposite sides of the cartridge, and the outward protrusions may be formed at a lower end of one side or lower ends of opposite sides of the frame.

In this case, the outward protrusions may be provided with fastening holes, into which fastening members to fix the battery module assembly are inserted, for example, the fastening holes being formed by drilling, and connection and fixing between the battery cells may be achieved through the fastening members.

In addition, each of the battery modules may include depressions fixed to the hold down bracket, which is configured to have a structure in which one side region of the hold down bracket covers the outward protrusions of the battery modules and the other side region of the hold down bracket is coupled to the base plate. The hold down bracket may be provided with fixing parts configured to be engaged with the depressions. Consequently, it is possible to stably fix the battery modules to the base plate against vibration of the battery pack in the forward and backward direction caused when external force is applied to the battery pack.

In general, the battery pack is loaded in a limited space of a device, in which the battery pack is applied, depending upon the type of the device. Consequently, it is important to configure the battery pack such that the battery pack can provide the maximum capacity in a predetermined space. The configuration of the battery pack is greatly dependent on the configuration of each of the battery modules constituting most of the battery pack.

Typically, in a battery pack for vehicles, a loading space of the battery pack in a vehicle is limited due to vehicle components disposed in the vehicle with high integration. For this reason, the battery pack may be loaded in a narrow space, such as a space defined between a driver's seat and an auxiliary seat, of the vehicle. To this end, the battery modules constituting the battery pack may be configured to have a rectangular parallelepiped structure or a tunnel type structure in which the height of the battery modules is greater than the width of the battery modules, and the length of the battery modules in the forward and backward direction is greater than the height of the battery modules.

Consequently, the cartridge may have a size and a shape corresponding to a loading position of the cartridge in a device, such as a vehicle. For example, the cartridge may be configured to have a rectangular parallelepiped structure in which the height of the cartridge is greater than the lower end width of the cartridge in a state in which the cartridge is loaded on the base plate.

Meanwhile, at least a portion of the lower part of each of the outward protrusions may be inclined upward toward the battery modules, and each of the outward protrusions may be provided at the lowermost end thereof with a downward extension protruding toward the base plate such that the outward protrusions formed at the lower end of the battery module assembly can be stably fixed to the base plate. Consequently, the hold down bracket is stably fixed to the base plate.

In addition, as mentioned above, each of the outward protrusions of the battery module assembly may be provided with a depression configured to be fixed to the hold down bracket, and the hold down bracket may be provided with a fixing part configured to be engaged with the depression. Consequently, it is possible to stably fix the battery module assembly to the base plate against vibration of the battery pack in the forward and backward direction caused when external force is applied to the battery pack.

Meanwhile, the hold down bracket may be configured to have a structure to increase rigidity of the hold down bracket against external vibration applied to the hold down bracket. For example, a bead may be formed between one side region and the other side region of the hold down bracket such that the rigidity of the hold down bracket is increased.

In order to achieve coupling between the hold down bracket and the base plate, the hold down bracket may be provided at the other side region thereof with one or more through holes for coupling with the base plate, for example, the through holes being formed by drilling, and fastening members may be inserted and fastened through the through holes.

Various fastening members may be provided. For example, the fastening members may be bolts or screws. However, the present invention is not limited thereto.

The battery pack may further include a top cover coupled to the base plate while covering the battery module assembly in a state in which the battery module assembly is loaded on the base plate. The top cover is coupled to the base plate in a state in which battery module assembly is fixed to the base plate via the hold down bracket.

In general, each of the battery cells may be a lithium ion battery or a lithium secondary battery. However, the present invention is not limited thereto.

For reference, a lithium secondary battery includes a positive electrode, a negative electrode, a separator, and a non-aqueous electrolytic solution containing lithium salt.

The positive electrode may be manufactured, for example, by applying a mixture of a positive electrode active material, a conductive agent, and a binder to a positive electrode current collector and drying the mixture. A filler may be further added to the mixture as needed.

The positive electrode active material may be, but is not limited to, a layered compound, such as a lithium cobalt oxide ($LiCoO_2$) or a lithium nickel oxide ($LiNiO_2$), or a compound replaced by one or more transition metals; a lithium manganese oxide represented by a chemical formula $Li_{1+x}Mn_{2-x}O_4$ (where x=0 to 0.33) or a lithium manganese oxide, such as $LiMnO_3$, $LiMn_2O_3$, or $LiMnO_2$; a lithium copper oxide ($Li_2CuO_2$); a vanadium oxide, such as $LiV_3O_8$, $LiFe_3O_4$, $V_2O_5$, or $Cu_2V_2O_7$; an Ni-sited lithium nickel oxide represented by a chemical formula $LiNi_{1-x}M_xO_2$ (where M=Co, Mn, Al, Cu, Fe, Mg, B, or Ga, and x=0.01 to 0.3); a lithium manganese composite oxide represented by a chemical formula $LiMn_{2-x}M_xO_2$ (where M=Co, Ni, Fe, Cr, Zn, or Ta, and x=0.01 to 0.1) or a chemical formula $Li_2Mn_3MO_8$ (where M=Fe, Co, Ni, Cu, or Zn); $LiMn_2O_4$ having Li of a chemical formula partially replaced by alkaline earth metal ions; a disulfide compound; or $Fe_2(MoO_4)_3$.

The conductive agent is generally added so that the conductive agent has 1 to 30 weight % based on the total weight of the compound including the positive electrode active material. The conductive agent is not particularly restricted so long as the conductive agent exhibits high conductivity while the conductive agent does not induce any chemical change in a battery to which the conductive agent is applied. For example, graphite, such as natural graphite or artificial graphite; carbon black, such as carbon black, acetylene black, Ketjen black, channel black, furnace black, lamp black, or summer black; conductive fiber, such as carbon fiber or metallic fiber; metallic powder, such as carbon fluoride powder, aluminum powder, or nickel powder; conductive whisker, such as zinc oxide or potassium titanate; conductive metal oxide, such as titanium oxide; or polyphenylene derivatives may be used as the conductive agent.

The binder is a component assisting in binding between the active material and conductive agent and in binding with the current collector. The binder is generally added in an amount of 1 to 30 weight % based on the total weight of the compound including the positive electrode active material. As examples of the binder, there may be used polyvinylidene fluoride, polyvinyl alcohol, carboxymethylcellulose (CMC), starch, hydroxypropylcellulose, regenerated cellulose, polyvinyl pyrollidone, tetrafluoroethylene, polyethylene, polypropylene, ethylene-propylene-di ene terpolymer (EPDM), sulfonated EPDM, styrene butadiene rubber, fluoro rubber, and various copolymers.

The filler is an optional component used to inhibit expansion of the positive electrode. There is no particular limit to the filler so long as it does not cause chemical changes in a battery to which the filler is applied and is made of a fibrous material. As examples of the filler, there may be used olefin polymers, such as polyethylene and polypropylene; and fibrous materials, such as glass fiber and carbon fiber.

On the other hand, the negative electrode may be manufactured by applying and drying a negative electrode active material to a negative electrode current collector. The above-described components may be selectively added to the negative electrode active material as needed.

As the negative electrode active material, for example, there may be used carbon, such as non-graphitizing carbon or a graphite-based carbon; a metal composite oxide, such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group 1, 2 and 3 elements of the periodic table, halogen; $0 \leq x \leq 1$; $1 \leq y \leq 3$; $1 \leq z \leq 8$); lithium metal; lithium alloy; silicon-based alloy; tin-based alloy; metal oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$; conductive polymer, such as polyacetylene; or a Li—Co—Ni based material.

The separator is interposed between the positive electrode and the negative electrode. As the separator, for example, an insulative thin film exhibiting high ion permeability and high mechanical strength may be used. The separator generally has a pore diameter of 0.01 to 10 μm and a thickness of 5 to 300 μm. As the material for the separator, for example, a sheet or non-woven fabric made of olefin polymer, such as polypropylene, which exhibits chemical resistance and hydrophobicity, glass fiber, or polyethylene is used. In a case in which a solid electrolyte, such as polymer, is used as an electrolyte, the solid electrolyte may also function as the separator.

The non-aqueous electrolytic solution containing lithium salt is composed of a polar organic electrolytic solution and lithium salt. As the electrolytic solution, a non-aqueous liquid electrolytic solution, an organic solid electrolyte, or an inorganic solid electrolyte may be used.

As examples of the non-aqueous liquid electrolytic solution, mention may be made of non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

As examples of the organic solid electrolyte, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte, mention may be made of nitrides, halides, and sulphates of lithium (Li), such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the above-mentioned non-aqueous electrolyte, and may include, for example, LiCl, LiBr, LiI, $LiClO_4$, $LiBF_4$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide.

In addition, in order to improve charge and discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolytic solution. According to circumstances, in order to impart incombustibility, the non-aqueous electrolytic solution may further include halogen-containing solvents, such as carbon tetrachloride and ethylene trifluoride. Furthermore, in order to improve high-temperature retention characteristics, the non-aqueous electrolytic solution may further include carbon dioxide gas.

In accordance with another aspect of the present invention, there is provided a device including the battery pack with the above-stated construction as a power source. The vehicle may be selected from among an electric vehicle, a hybrid electric vehicle, and a plug-in hybrid electric vehicle.

The structure of the device and a method of manufacturing the device are well known in the art to which the present invention pertains, and therefore a detailed description thereof will be omitted.

Effects of the Invention

As is apparent from the above description, a battery pack according to the present invention includes a hold down bracket to correctly fix battery modules constituting a battery module assembly to a base plate. Consequently, the present invention has the effect of stably fixing the battery modules and minimizing internal deformation of the battery pack due to vibration of the battery pack in a forward and backward direction caused when external force is applied to the battery pack.

BRIEF DESCRIPTION OF DRAWINGS

The above and other objects, features and other advantages of the present invention will be more clearly understood from the following detailed description taken in conjunction with the accompanying drawings, in which:

FIG. 1 is a perspective view showing a conventional battery pack;

FIG. 2 is an exploded perspective view showing a battery pack according to an embodiment of the present invention;

FIG. 3 is a perspective view showing a battery module and a hold down bracket according to an embodiment of the present invention;

FIG. 4 is a side perspective view showing the battery module to which the hold down bracket according to the embodiment of the present invention is coupled; and FIGS. 5 and 6 are sectional views taken along lines A-A' and B-B' of FIG. 4, respectively.

DETAILED DESCRIPTION OF THE INVENTION

Now, exemplary embodiments of the present invention will be described in detail with reference to the accompanying drawings. It should be noted, however, that the scope of the present invention is not limited by the illustrated embodiments.

FIG. 2 is an exploded perspective view typically showing a battery pack according to an embodiment of the present invention, and FIG. 3 is a perspective view typically showing a battery module and a hold down bracket according to an embodiment of the present invention.

Referring to these figures, a battery pack 200 includes a battery module assembly 210 configured to have a structure in which two or more battery modules 211, each of which includes battery cells (not shown) arranged in an upright state such that electrode terminals of the battery cells are directed upward, are arranged such that the battery modules are adjacent to each other, and outward protrusions 220 are formed at the lower ends of opposite sides of each of the battery modules 211, a base plate 230, on the top of which the battery module assembly 210 is loaded, and a hold down bracket 240 having one side region covering the outward protrusions 220 of the battery modules 211 and the other side region coupled to the base plate 230 so as to correctly fix the respective battery modules 211 of the battery module assembly 210 to the base plate 230.

A loading space of the battery pack 200 in a vehicle is limited due to vehicle components disposed in the vehicle with high integration. For this reason, the battery module assembly 210 constituting the battery pack 200 is configured to have a structure in which a height H of the battery module assembly 210 is greater than a width W of the battery module assembly 210, and a length L of the battery module assembly 210 in the forward and backward direction is greater than the height H of the battery module assembly 210 such that the battery module assembly 210 can be loaded in a narrow space defined between a driver's seat and an auxiliary seat of the vehicle. The battery pack 200 is configured to have a rectangular parallelepiped structure corresponding to that of the battery module assembly 210.

Each of the battery modules 211 constituting the battery module assembly 210 is configured to have a structure in which the battery cells are laterally arranged such that the battery cells are adjacent to each other, and the battery cells are laterally stacked in a state in which each of the battery cells is fixed to a cartridge 250. The battery cells are laterally arranged such that the electrode terminals of the battery cells protrude upward, and the cartridge 250 is configured to have a frame structure to fix an outer edge sealed portion of each of the battery cells.

The outward protrusions 220 and depressions 260, to which the hold down bracket 240 is fixed, are formed at the lower ends of the opposite sides of the cartridge 250. In addition, fastening holes 280, into which fastening members (not shown) to fix the battery module assembly 210 are inserted, are further formed at the lower ends of the opposite sides of cartridge 250 by drilling. Consequently, the fastening members are inserted into the fastening holes 280 to fix the battery module assembly 210 configured to have a structure in which the cartridges 250 are stacked in a state in which the cartridges 250 are laterally arranged.

The hold down bracket 240 is provided with fixing parts 270 configured to be engaged with the depressions 260. The number and shape of the fixing parts 270 correspond to those of the depressions 260. Between one side and the other side of the hold down bracket 240 is formed a bead structure 290 to increase rigidity of the hold down bracket 240 against external vibration applied to the hold down bracket 240.

In addition, the hold down bracket 240 is provided with through holes 281 and 282 for coupling with the base plate 230. The through holes 281 and 282 are formed by drilling. Fastening members (not shown) are inserted and fastened through the through holes 281 and 282.

FIG. 4 is a side perspective view typically showing the battery module to which the hold down bracket according to the embodiment of the present invention is coupled, and FIGS. 5 and 6 are sectional views taken along lines A-A' and B-B' of FIG. 4, respectively.

Referring to these figures, the lower part of the outward protrusion 220 is inclined upward toward the battery modules 211, and a downward extension 300 protruding toward the base plate 230 is formed at the lowermost end of the outward protrusion 220 such that the outward protrusion 220 can be stably fixed to the base plate 230. Consequently, the hold down bracket 240 is stably fixed to the base plate 230.

As indicated by C of FIG. 5, the fixing part 270 of the hold down bracket 240 is formed in a shape in which the fixing part 270 is disposed in tight contact with the depression 260 of the outward protrusion 220. In a region at which the fixing part 270 is not formed, as indicated by D of FIG. 6, the hold down bracket 240 is formed in a shape in which the hold down bracket 240 is disposed in tight contact with the outside of the outward protrusion 220. Consequently, it is possible to prevent movement of the battery modules 211.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A battery pack comprising:
   a battery module assembly configured to have a structure in which two or more battery modules, each of which comprises battery cells arranged in an upright state such that electrode terminals of the battery cells are directed upward, are arranged such that the battery modules are adjacent to each other in a first direction, and an outward protrusion is formed at a lower end of a side of each of the battery modules;
   a base plate, on a top of which the battery module assembly is loaded;
   a hold down bracket having a first end, a second end opposite the first end, a first side region covering the outward protrusion of one of the battery modules and a second side region coupled to the base plate so as to correctly fix the respective battery modules of the battery module assembly to the base plate;
   at least one depression formed in the outward protrusion of one of the battery modules; and
   at least one fixing part formed between the first end and the second end of the hold down bracket and extending from an inner surface of the hold down bracket and engaging the at least one depression.

2. The battery pack according to claim 1, wherein each of the battery cells is a plate-shaped battery cell.

3. The battery pack according to claim 2, wherein each of the battery cells is configured to have a structure in which an electrode assembly is mounted in a laminate battery case.

4. The battery pack according to claim 1, wherein each of the battery modules is configured to have a structure in which two or more unit modules, each of which comprises one or more battery cells mounted in a cartridge, are arranged such that the unit modules are adjacent to each other in the first direction.

5. The battery pack according to claim 4, wherein the battery cells of each of the battery modules are connected in series to each other.

6. The battery pack according to claim 4, wherein the cartridge is configured to have a frame structure to fix outer edge sealed portions of the battery cells located at opposite sides of the cartridge.

7. The battery pack according to claim 6, wherein the outward protrusion is formed at a lower end of one side of the frame.

8. The battery pack according to claim 7, wherein the outward protrusion is provided with fastening holes, into which fastening members to fix the battery module assembly are inserted.

9. The battery pack according to claim 4, wherein a height of the cartridge is greater than a lower end width of the cartridge in a state in which the cartridge is loaded on the base plate.

10. The battery pack according to claim 4, wherein the at least one depression is formed between two cartridges.

11. The battery pack according to claim 1, wherein at least a portion of a lower part of the outward protrusion is inclined upward toward the battery module.

12. The battery pack according to claim 11, wherein the outward protrusion is provided at a lowermost end thereof with a downward extension protruding toward the base plate.

13. The battery pack according to claim 12, wherein a part of the base plate is configured to be engaged with the downward extension.

14. The battery pack according to claim 1, wherein a bead is formed between the first side region and the second side region of the hold down bracket.

15. The battery pack according to claim 1, wherein the hold down bracket is provided at the second side region thereof with one or more through holes for coupling with the base plate.

16. The battery pack according to claim 15, wherein fastening members are inserted and fastened through the through holes.

17. The battery pack according to claim 16, wherein the fastening members are bolts or screws.

18. The battery pack according to claim 1, further comprising a top cover coupled to the base plate while covering the battery module assembly in a state in which the battery module assembly is loaded on the base plate.

19. A vehicle comprising a battery pack according to claim 1 as a power source.

20. The vehicle according to claim 19, wherein the vehicle is an electric vehicle, a hybrid electric vehicle, or a plug-in hybrid electric vehicle.

21. The battery pack according to claim 1, wherein the at least one depression formed in each of the battery modules is a plurality of depressions spaced from one another in the first direction, and
   wherein the at least one fixing part is a plurality of projections corresponding to the plurality of depressions.

22. The battery pack according to claim 1, wherein each battery module has a pair of outward protrusions, the outward protrusions being formed on opposite sides of each battery module.

* * * * *